Jan. 31, 1950     P. R. HUTCHINSON     2,495,812

LAWN MOWER BLADE

Filed July 2, 1947

INVENTOR.
Paul R. Hutchinson
BY
Allard A. Braddock
ATTORNEY

Patented Jan. 31, 1950

2,495,812

UNITED STATES PATENT OFFICE 2,495,812

LAWN MOWER BLADE

Paul R. Hutchinson, Rochester, N. Y.

Application July 2, 1947, Serial No. 758,646

3 Claims. (Cl. 56—294)

This invention relates to an improved lawn mower blade.

Lawn mowers operate on the principle of a shearing action. A multiplicity of spiral-shaped blades rotate rapidly past a fixed, or stationary, blade. Blades of grass which impinge on the stationary blade are severed by the shearing action of the rotating blades with the stationary blade. The rotating blades make actual sliding contact with the stationary blade in the course of their rotation. Conventional lawn mowers become dull rather quickly and the friction caused by the rotating blades sliding over the stationary blade increases the energy required to operate the mower. Most of the noise of operation is caused by the constant contact between the rotating blades and the stationary blade.

In my Patent 2,469,730, which issued May 10, 1949, I described a method of sharpening lawn mowers which greatly decreases the effort required for, and the noise attendant upon, their operation.

It is an object of this invention to provide an improved rotating blade for a lawn mower. Another object is to provide a lawn mower rotating blade which resists the harmful effect of nicks caused by stones and similar hard objects. A further object is to provide a lawn mower rotating blade which is easy to sharpen. A still further object is to improve the state of the art. Other objects will appear hereinafter.

These and other objects are accomplished by my invention which includes a lawn mower rotating blade of an L-shaped cross-sectional outline or profile to provide a thick surface along the base of the cutting edge.

Figure 1:
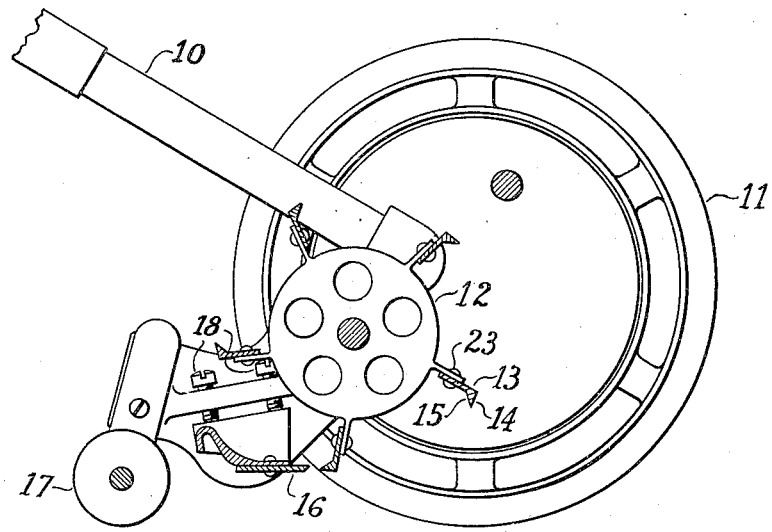
Figure 2:
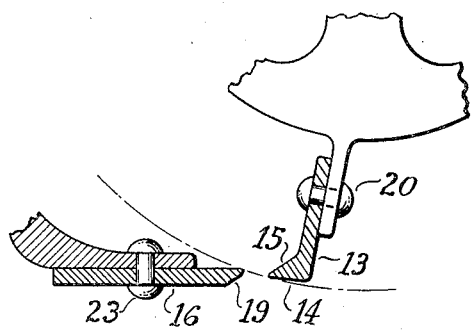
Figures 3, 4:
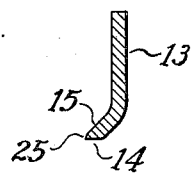
Figure 5:
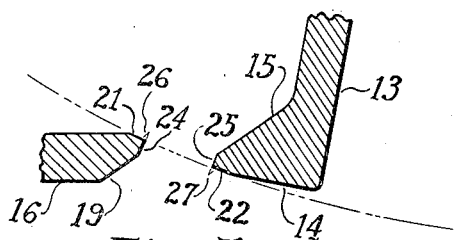

In the accompanying drawing Fig. 1 is a sectional view through the lawn mower showing the stationary blade and five rotating blades with an L-shaped profile. Fig. 2 is an enlarged view of a portion of the section of Fig. 1 showing the stationary blade and one rotating blade. Fig. 3 is an enlarged sectional view showing rotating blade with an alternative type of L-shaped profile. Fig. 4 shows still another type of rotating blade in section. Fig. 5 is a sectional view of the stationary blade and one rotating blade after abrading and showing the cutting faces before the burrs have been sheared off by rotation.

Similar numerals refer to similar parts throughout the several views.

Numeral 10 designates the lawn mower handle. Numeral 11 designates one of the wheels which makes contact with the ground. Wheel 11 is geared to rotating mechanism 12 in such a manner that rotating mechanism 12 turns faster than wheel 11. Rotating blades 13 are rigidly attached to rotating mechanism 12. Numeral 14 designates the outer face of rotating blade 13. Numeral 15 designates the face of the rotating blade which approaches the stationary blade when the machine is operated. Numeral 16 designates the stationary blade. Numeral 17 designates the roller which maintains stationary blade 16 at the proper height above the ground and acts as a rest when the lawn mower is not in use. Numeral 18 designates bolts for adjusting the position of the stationary blade. Numeral 19 designates the side of stationary blade 16 which is sharpened. Numeral 20 designates a rivet which holds rotating blade 13 in place. Numeral 21 designates the upper abraded portion of stationary blade 16. Numeral 22 designates the lower abraded portion of rotating blade 13. Numeral 23 designates a bolt or rivet which holds stationary blade 16 in place. Numeral 24 designates the sharpened face of stationary blade 16. Numeral 25 designates the sharpened face of rotating blade 13. Numeral 26 designates a burr which is left extending upward from face 24 during the operation of sharpening. Numeral 27 designates a similar burr extending downward from face 25.

In operation the lawn mower is pushed forward and wheel 11 turns. Rotating mechanism 12 turns in the same direction as wheel 11 but several times as fast. In operating the conventional design of lawn mower side 14 of stationary blade 13 makes actual contact with stationary blade 16. As grass impinges on side 19 of stationary blade 16 side 14 of rotating blade 13 approaches. There is some shearing action on the blades of grass between edge 22 of rotating blade 13 and edge 21 of stationary blade 16.

The conventional lawn mower is sharpened by honing, filing, or grinding side 14 of rotating blades 13. The blades do not stay sharp for long as contact with stationary blade 16 takes away the sharp edge quickly.

In the conventional lawn mower rotating blades 13 are made as thin as possible for the requisite structural strength, usually about ⅛ inch. Thicker blades are harder to sharpen and cause additional friction upon contact with the stationary blade, rendering the mower more difficult to operate.

My invention comprises a rotating blade of L-shaped profile which makes face 14 comparatively thick, i. e., $\tfrac{3}{16}$ inch or greater. This L-shaped profile may be obtained by fastening a strip to the outer edge of the blade or by bending the outer edge of the blade which enables it to operate satisfactorily in the event a small piece is nicked by contact with a stone or similar hard object. Unless the nick has been large enough to penetrate entirely through the blade there will still be shearing surface present and the efficiency of the mower is not seriously impaired. By filing at the location of the nick to leave a downward burr the full efficiency of the blade may be restored, quickly and easily. To accomplish the same thing in a conventional lawn mower would necessitate grinding all rotating blades to the depth of the nicked portion.

With my improved blade a small gap is left between stationary blade 16 and rotating blade 13. This gap is preferably the smallest possible which will allow rotating blades 13 to rotate without striking stationary blade 16. Face 19 of the stationary blade and face 15 of the rotating blade lie in approximately the same plane at the instant of closest approach to each other. This angle is greater than the vertical and is preferably in a plane of about 45° upward and away from the lawn mower handle. This 45° angle is not the best for the two edges 24 and 25 but it enables the two edges to be abraded to the best angle with a minimum of difficulty. Thus, by having the faces 19 and 15 come to an edge from about a 45° angle, the faces 24 and 25 may be produced with a minimum of filing or other abrading.

Face 24 is produced by filing or otherwise abrading face 19 and similarly face 25 is produced from face 15. Faces 24 and 25 should be of very small area. By abrading face 19 in an upwardly direction and face 15 in a downwardly direction burrs 26 and 27 are produced at the same time that faces 24 and 25 are produced. Rotation of the blades then shears off the greater part of burrs 26 and 27 to leave thin serrated edges of extreme cutting power. In the event that the mower becomes dull it may be resharpened easily by filing faces 24 and 25 to a slightly greater area and again leaving burrs 26 and 27. It will be noted that faces 19 and 15 are in the same plane at their point of closest approach and this is also true of faces 24 and 25.

What I claim is:

1. In a lawn mower, rotating blades of substantially L-shaped cross-sectional profile in which the base of the L is at the outside of the radius of rotation and slanted toward the stationary blade at the bottom of the swing and the underside of the L has burr-stumps extending radially outward from the leading edge thereof.

2. In a lawn mower, rotating blades of substantially L-shaped profile in which the base of the L is at the outside of the radius of rotation of the blades and opens toward the stationary blade at the bottom of the swing and in which the approaching cutting faces lie in a plane between 0° and 45° off the vertical and slanting in the direction away from the lawn mower handle, said L-shaped portion having longitudinal burr-stumps extending radially outward from the leading edge thereof.

3. In a lawn mower, the improvement which comprises rotatable blades of L-shaped cross-sectional profile in which the base of the L is at the outside of the radius of rotation and opened toward the stationary blade when said rotatable blades are at the bottom of their swing, said rotatable blades being free to rotate without making sliding contact with said stationary blade and having burr-stumps extending radially outward from the leading edge thereof.

PAUL R. HUTCHINSON.

REFERENCES CITED

The following references are of record in the file of this patent:

UNITED STATES PATENTS

| Number | Name | Date |
|---|---|---|
| 374,808 | Passmore | Dec. 13, 1887 |
| 1,832,390 | Hessenbruch | Nov. 17, 1931 |
| 2,094,345 | Bootes | Sept. 28, 1937 |
| 2,199,919 | Limbach | May 7, 1940 |
| 2,236,612 | Stoner | Apr. 1, 1941 |

FOREIGN PATENTS

| Number | Country | Date |
|---|---|---|
| 833,939 | France | Aug. 1, 1938 |